United States Patent [19]
Vetsch

[11] 3,877,323
[45] Apr. 15, 1975

[54] TURRET INDEXING MACHINE

[75] Inventor: Rudolf Vetsch, Walton Hills, Ohio

[73] Assignee: The Warner & Swasey Company, Cleveland, Ohio

[22] Filed: Jan. 9, 1973

[21] Appl. No.: 322,131

[52] U.S. Cl. ................................ 74/826; 74/813 L
[51] Int. Cl. ............................................. B23b 29/32
[58] Field of Search ............ 74/826, 813 L; 82/36 A

[56] References Cited
UNITED STATES PATENTS

| | | | |
|---|---|---|---|
| 2,975,657 | 3/1961 | Samuel | 74/826 X |
| 3,242,771 | 3/1966 | Maier et al. | 74/826 |
| 3,464,292 | 9/1969 | Parsons et al. | 74/826 |
| 3,513,730 | 5/1970 | Lohneis | 74/826 X |
| 3,545,317 | 12/1970 | Shultz et al. | 74/826 X |
| 3,651,698 | 3/1972 | Riedrich et al. | 74/826 X |

*Primary Examiner*—Samuel Scott
*Assistant Examiner*—F. D. Shoemaker

[57] ABSTRACT

An improved machine tool includes a hydraulically actuated coupling assembly. The coupling assembly includes a first coupling member which is fixedly connected with a turret a second coupling member which is connected with a drive assembly for moving the turret axially. When the coupling assembly is engaged, annular arrays of teeth on the coupling members are disposed in meshing engagement to hold the turret against rotation. When the coupling assembly is disengaged, the teeth are spaced apart and the turret can be rotated by a drive motor. When the coupling assembly is to be disengaged, a valve is actuated to port fluid under pressure to a first chamber formed between face surfaces on the two coupling members to move them apart and disengage the teeth. When the coupling assembly is to be re-engaged, the valve is actuated to port fluid under pressure to a second chamber to effect movement of the coupling members toward each other. During subsequent movement of the turret under the influence of the axial drive assembly, fluid pressure in the second chamber prevents disengagement of the coupling assembly.

14 Claims, 6 Drawing Figures

TURRET INDEXING MACHINE

BACKGROUND OF THE INVENTION

The present invention relates generally to a machine tool having a turret which is selectively operable to move a desired one of a plurality of tools into operative relationship with a workpiece and more specifically to an improved turret indexing and locking arrangement.

Machine tools having turrets which are rotatable and movable axially are disclosed in U.S. Pat. application Ser. No. 292,982 filed Sept. 28, 1972 by Baxter T. Fullerton and entitled Machine Tool and in U.S. Pat. No. 2,644,222. When the turret of one of these machine tools is being moved axially, it is necessary to hold the turret against rotation. However, the performing of successive machining operations may require the turret to be rotated about its central axis in order to move a previously used tool away from an operating position and to move another tool to the operating position.

SUMMARY OF THE PRESENT INVENTION

The present invention provides a new and improved indexing arrangement for moving the turret of a machine tool to position tools mounted on the turret relative to a workpiece. When the turret is to be indexed, an axial drive assembly is activated to move a gear on a turret bar into meshing engagement with the gear which is driven by an indexing motor. A coupling assembly is then actuated from an engaged condition in which the turret is held against rotation to a disengaged condition in which the indexing motor can rotate the turret to move a selected tool on the turret into an operating relationship with a workpiece. The coupling assembly is disengaged by moving a pair of coupling members apart to disengage annular arrays of teeth on the coupling members. After the turret head has been rotated to the desired extent, the teeth on the coupling members are moved back into meshing engagement to hold the turret against rotation.

An improved hydraulic actuator arrangement is provided for effecting operation of the coupling assembly between the engaged and disengaged conditions. This improved actuator arrangement effects movement between coupling members by applying fluid pressure to surfaces on one or more of the coupling members. Thus when the coupling assembly is to be disengaged, fluid pressure is applied against inwardly facing surfaces on the two coupling members to thereby move the coupling members apart. When the coupling assembly is to be re-engaged, fluid pressure is applied against an outwardly facing surface on one of the coupling members and against an opposing face surface to effect movement of one of the coupling members toward the other coupling member.

Accordingly, it is an object of this invention to provide a new and improved indexing and locking arrangement for the turret of a machine tool and wherein the indexing and locking arrangement includes a coupling assembly which is actuated between an engaged condition and a disengaged condition under the influence of fluid pressure.

Another object of this invention is to provide a new and improved machine tool having a coupling assembly which is operable between an engaged condition holding a turret against rotation and a disengaged condition and wherein the coupling assembly includes coupling members having sets of teeth which are moved relative to each other under the influence of fluid pressure applied against surfaces on the coupling members to thereby effect operation of the coupling assembly between the engaged and disengaged conditions.

Another object of this invention is to provide a new and improved machine tool having a turret head disposed on an axially movable and rotatable turret bar which is held against rotation by a coupling assembly and wherein a gear disposed on the turret bar is moved into engagement with a drive gear when the turret is to be indexed.

BRIEF DESCRIPTION OF THE DRAWINGS

The foregoing and other objects and features of the present invention will become more apparent upon consideration of the following description taken in connection with the accompanying drawings wherein.

DESCRIPTION OF ONE PREFERRED EMBODIMENT

Figure 1:
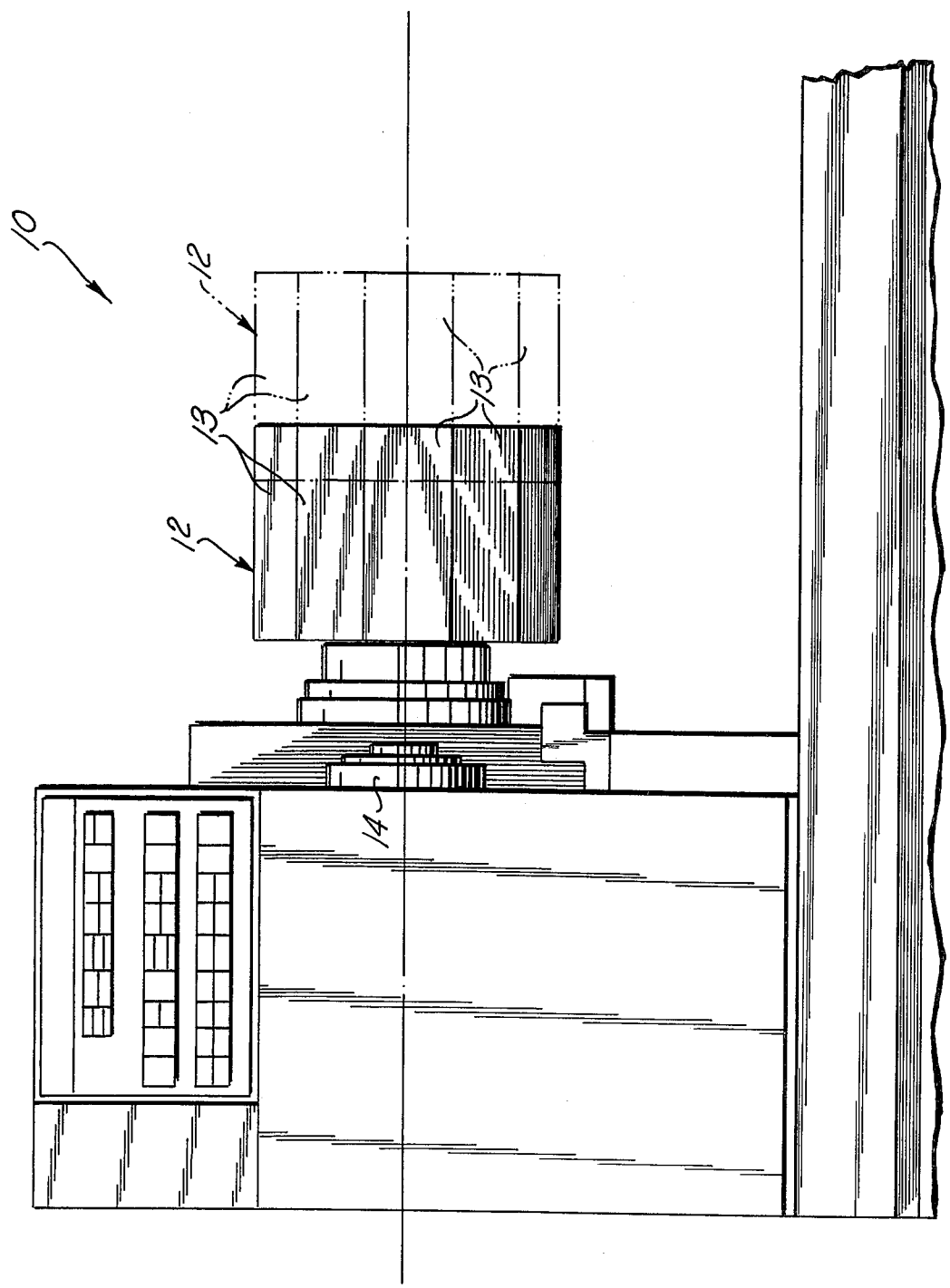
FIG. 1 is a schematic illustration of a machine tool having a turret which can be moved axially and rotated relative to a workpiece held by a spindle.

A machine tool 10 constructed in accordance with the present invention has a turret head 12 which is movable along an X-axis between a retracted position (shown in solid lines in FIG. 1) and an extended position (shown in dashed lines in FIG. 1) to move suitable tools mounted on face or support surfaces 13 relative to a workpiece being rotated by a spindle 14. An axial drive arrangement 15 (see FIG. 2) is operable to move the turret head 12 axially with a coupling assembly 16 in an engaged condition. When the turret head 12 and coupling assembly 16 have been moved by the axial drive arrangement 15 to the extended position (shown in dashed lines in FIG. 2), the coupling assembly 16 can be disengaged and an indexing arrangement 18 activated to rotate a turret bar 20 about its central or X-axis to thereby index the turret head 12 relative to the spindle 14. In addition, a Y-axis drive screw 22 can be operated to move a housing 24 along ways 26 to move the turret head toward and away from the axis of rotation of the spindle 14 in the manner more fully disclosed in the aforesaid Fullerton application.

Figure 2:
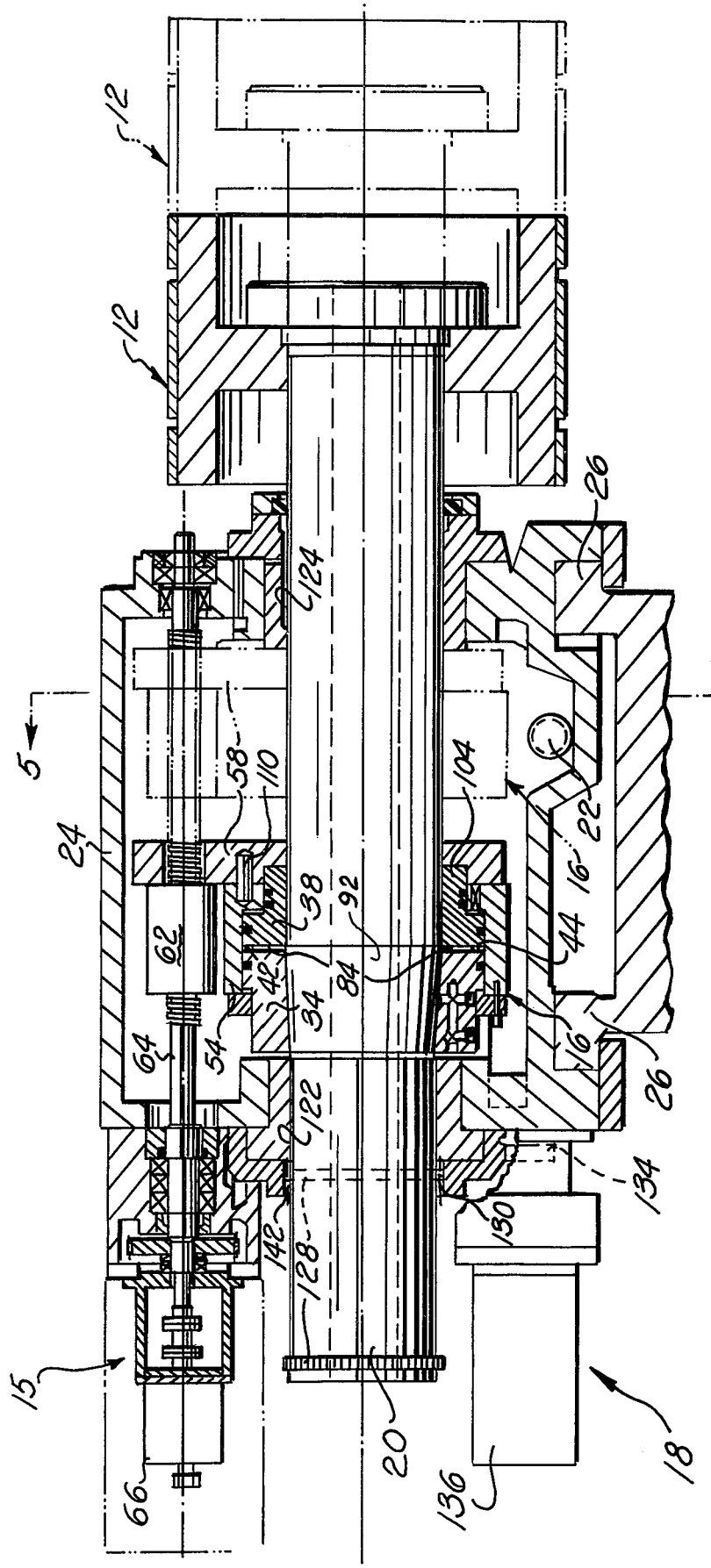
FIG. 2 is a sectional view illustrating the relationship between an improved coupling assembly which is operable between an engaged condition holding the turret against rotation and a disengaged condition, an axial drive arrangement for moving the turret axially with the coupling assembly engaged, and an indexing assembly for rotating the turret with the coupling assembly disengaged.
Figure 3:
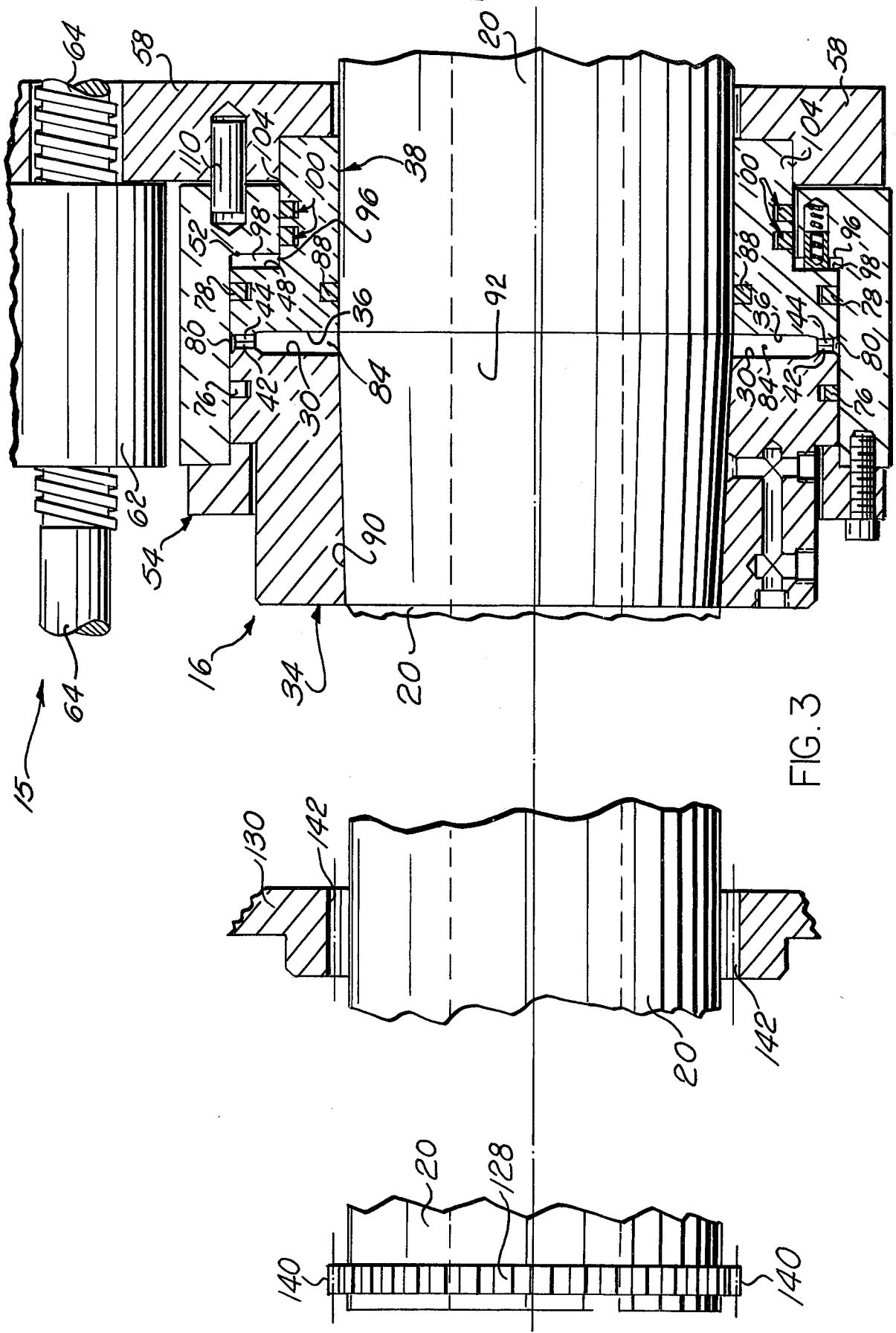
FIG. 3 is an enlarged fragmentary view illustrating the relationship between the coupling assembly and turret bar, the coupling assembly being illustrated in an engaged condition.
Figure 4:
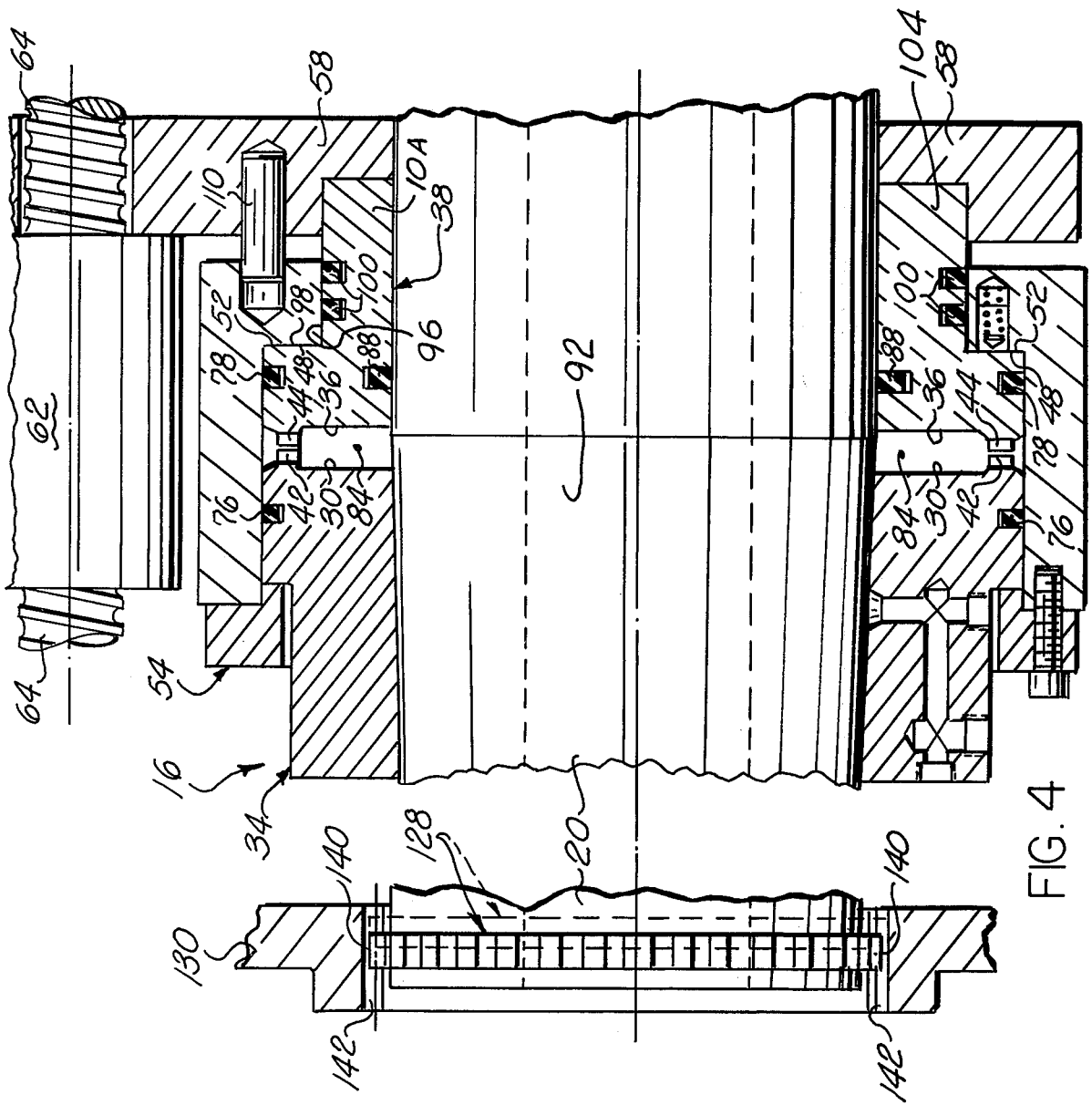
FIG. 4 is an enlarged fragmentary view, generally similar to FIG. 3, illustrating the coupling assembly in the disengaged condition.

In accordance with one feature of this invention, the coupling assembly 16 is actuated between the engaged condition of FIGS. 2 and 3 and the disengaged condition of FIG. 4 under the influence of fluid pressure. Thus, when the coupling assembly 16 is to be disengaged, fluid pressure is applied against an annular inner face surface 30 of a coupling member 34 which is fixedly connected to the turret bar 20. In addition, fluid pressure is applied against an annular inner face surface 36 on a second coupling member 38 which is connected to the axial drive assembly 15. The application of fluid pressure to the two inner face surfaces 30 and 36 results in axial movement of the coupling member 34 and the turret bar 20 from the position shown in FIG. 3 to the position shown in FIG. 4. This axial movement of the coupling member 34 and turret bar 20 moves an annular array of teeth 42 on the coupling member 34 out of meshing engagement with an annular array of teeth 44 on the coupling member 38. When this occurs, the coupling assembly 16 is disengaged and the turret bar 20 can be rotated about its central axis to index the turret head 12. It should be noted that the annular surface 36 is disposed inwardly of a cylindrical plane which extends through the annular array of teeth 44.

Once the turret head 12 has been indexed to the desired operating position, the coupling assembly 16 is re-engaged to hold the turret head 12 in the selected position. To effect re-engagement of the coupling assembly 16, fluid pressure is applied to an annular face surface 48 on the coupling member 38 and an opposing annular face surface 52 on the inside of a collar 54 which circumscribes the two coupling members 34 and 38. The application of fluid pressure to the two surfaces 48 and 52 results in movement of the coupling member 34 toward the coupling member 38 to move the two sets of teeth 42 and 44 back into meshing engagement and thereby re-engage the coupling assembly 16. The two sets of teeth 42 and 44 are of the well known Curvic type and are effective to hold the turret head 12 against rotation when the clutch assembly 16 is engaged.

Figure 5:
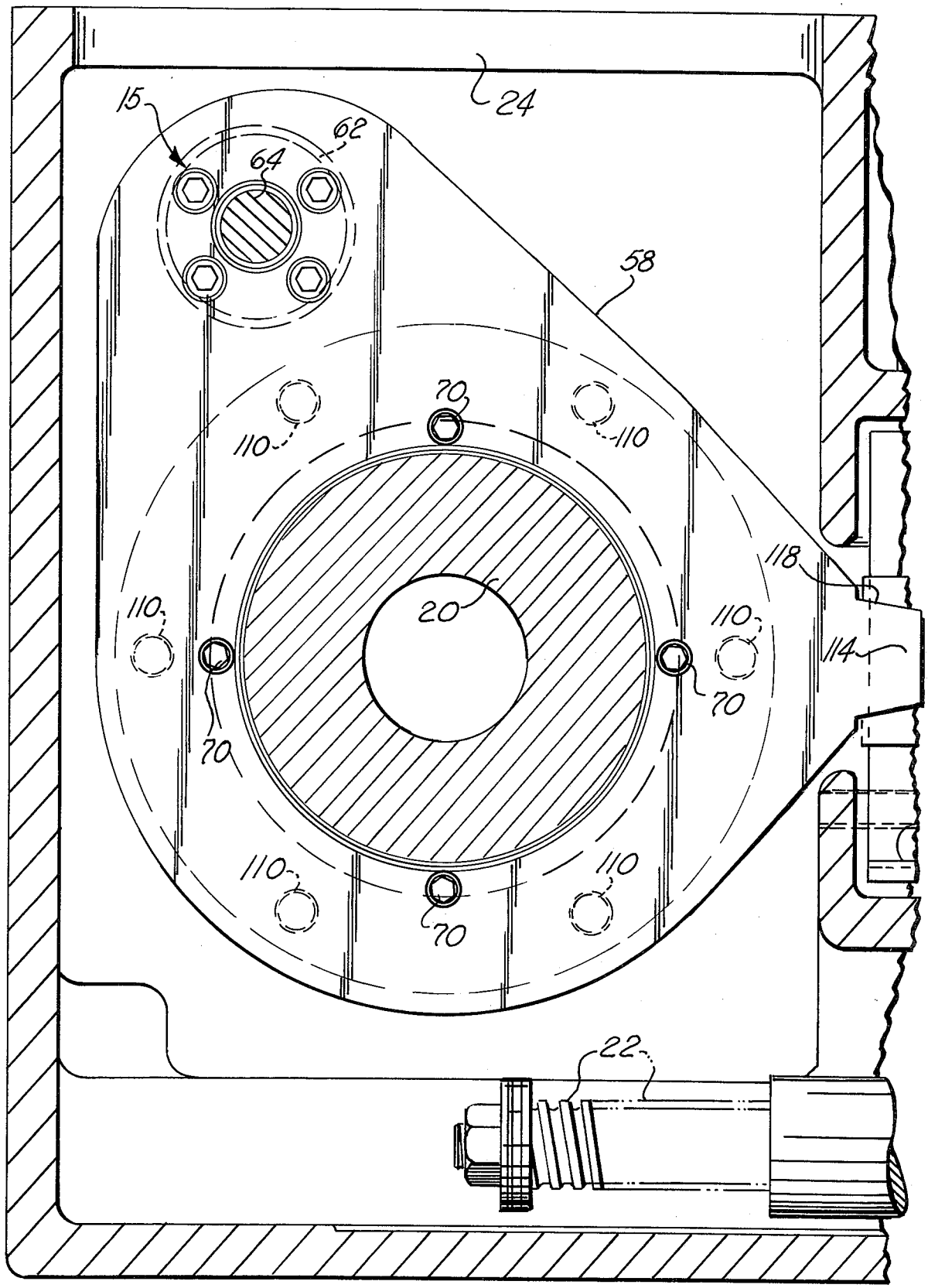
FIG. 5 is an enlarged sectional view, taken generally along the line 5—5 of FIG. 2, illustrating the relationship between the turret bar, an axial drive assembly, and a transverse drive assembly.

The coupling assembly 16 is locked in the engaged condition of FIG. 3 under the influence of fluid pressure applied against the two surfaces 48 and 52. This enables the axial drive assembly 15 to move the turret head 12 toward the right (as viewed in FIG. 2) under the influence of forces transmitted to the turret bar 20 through the engaged coupling assembly 16. Thus, the coupling member 38 is fixedly connected to a drive plate 58. The plate 58 is connected with a ball nut 62 (see FIG. 5) which is movable along a rotatable screw shaft 64 under the influence of an X-axis drive motor 66.

Movement of the nut 62 along the screw shaft 64 toward the right (as viewed in FIGS. 2 and 3) results in the coupling member 38 being pulled in the same direction by forces transmitted between the coupling member and drive plate 58 by suitable connections 70. In the absence of a fluid pressure force tending to separate the surfaces 48 and 52, the coupling member 38 would slide rightwardly (as viewed in FIG. 3) along the turret bar 20 under the influence of forces resulting from movement of nut 62 until the surfaces 48 and 52 are disposed in abutting engagement and the coupling assembly 16 is in the disengaged condition of FIG. 4. However, fluid pressure forces applied against the annular face surfaces 48 and 52 prevent relative movement between the coupling members 34 and 38. Therefore, the coupling assembly 16 is maintained in the engaged condition during axial movement of the turret head 12 toward the right. Of course, during leftward movement (as viewed in FIGS. 2 and 3) of the turret head 12, the coupling members 34 and 38 are pressed together and tend to remain engaged.

The two coupling members 34 and 38 cooperate with the collar 54 to define a pair of chambers which receive fluid under pressure to actuate the coupling assembly 16. Thus, the two coupling members 34 and 38 are provided with a pair of circular seal rings 76 and 78 which engage a cylindrical inner surface 80 on the collar 54 to form a fluid tight chamber 84 in which the annular arrays or teeth 42 and 44 are disposed. A leakage of fluid from the chamber 84 along the turret bar 20 between the coupling member 38 and turret bar is prevented by a third annular sealing ring 88. The coupling member 34 has a tapered inner surface 90 which is forced against an axially tapered portion 92 of the turret bar 20 to provide a fluid tight connection. Since the coupling member 34 is fixedly connected with the turret bar 20 and does not move relative to the turret bar, it is not necessary to provide a seal ring between the coupling member 34 and turret bar. Of course, when fluid under pressure is applied against the radially extending surfaces 30 and 36 of the chamber 84, the coupling member 34 and turret bar 20 are moved axially relative to the coupling member 38 and the chamber 84 expands as the coupling assembly 16 is disengaged.

The coupling member 38 cooperates with the cylindrical collar surface 80 and an annular end surface 52 on the collar 54 to form a second chamber 98. A pair of circular seal rings 100 are provided in the cylindrical body portion 104 of the coupling member 38 and sealingly engage the surface 96 to further prevent the leakage of fluid from the chamber 98. When the coupling assembly 16 is operated from the engaged condition in FIG. 3 to the disengaged condition of FIG. 4, the chamber 98 is connected in communication with drain. This enables fluid to exhaust from the chamber 98 as it contacts and the coupling assembly 16 is disengaged.

When the coupling assembly 16 is to be operated from the disengaged condition of FIG. 4 to the engaged condition of FIG. 3, the chamber 84 is connected to drain and fluid under pressure is ported into the chamber 98. Relatively high pressure fluid in the chamber 98 presses against the two annular surfaces 48 and 52 to expand the chamber 98 and contract the chamber 84. This results in rightward movement (as viewed in FIGS. 3 and 4) of the coupling 34 and turret bar 20. As this occurs, the teeth 42 move into meshing engagement with the teeth 44 (see FIG. 3).

When the coupling assembly 16 is being operated from the disengaged condition of FIG. 4 to the engaged condition of FIG. 3, fluid pressure applied against the two opposing surfaces 48 and 52 of the chamber 98 result in the coupling member 34 and turret bar 20 being pulled toward the right (as viewed in FIG. 4) under the influence of forces transmitted through the collar 54 to the coupling member 34. Thus, the coupling member 38 acts as a fixed piston with the collar 54 and coupling member 34 forming a movable cylinder or housing which is moved axially relative to the coupling member 38 during operation of the coupling assembly 16 between the engaged and disengaged conditions. A plurality of guide pins 110 are connected with the plate 58 to guide movement of the collar 54 relative to the plate during operation of the coupling assembly 16 between the engaged and disengaged conditions.

During machining operations, the axial drive assembly 15 is activated to move the turret head 12 axially between the extended and retracted positions to thereby move tools on the turret head 12 relative to a workpiece being rotated by the spindle 14. If at the end of one machining operation the turret head 12 is in the retracted position shown in solid lines in FIGS. 1 and 2 and the turret head must be rotated or indexed to move another tool into an operating relationship with the workpiece before the next machining operation is undertaken, the turret head 12 is moved to the extended position so that tools on the turret head will be clear of the workpiece before it is rotated.

To move the turret head 12 from the retracted position to the extended position, a reversible motor 66 is activated to rotate the screw 64. This causes the nut 62 to move the plate 58 toward the right (as viewed in FIG. 2). During this movement of the plate 58, fluid pressure in the chamber 98 maintains the coupling assembly 16 engaged so that forces are transmitted from the plate 58 through the coupling member 38 and collar 54 to the coupling member 34 which is fixedly connected to the turret bar 20. As the turret bar 20 and turret head 12 are moved toward the right (as viewed in FIG. 2) a guide flange 114 on the plate 58 moves along a tunnel or guide track 118 (see FIG. 5) and the turret bar 20 slides axially on cylindrical support or bearing surfaces 122 and 124 connected with the housing 24.

As the turret head 12 approaches the extended position (shown in dashed lines in FIG. 2) a gear 128 on the opposite end of the turret bar 20 moves toward a ring gear 130 which is rotatably mounted on the housing 24. During the final portion of movement of the turret head 12 to the extended position, the teeth on the gear 128 move into meshing engagement with teeth on the ring gear 130. After the coupling assembly 16 has been disengaged, the ring gear 130 is driven by an output gear 134 (see FIG. 2) connected with an indexing motor 136. Due to the meshing engagement between the ring gear 130 and the gear 128 which is fixedly connected with the turret bar 20, the turret bar 20 is rotated to index the turret head 12 under the influence of the indexing motor 136. Of course, during this rotation of the turret bar 20, the coupling member 34 is rotated relative to the collar 54 and coupling member 38. Once the turret head 12 has been indexed to the desired position, the indexing motor 136 is de-activated, the coupling assembly 16 is re-engaged and the axial drive assembly 15 is activated to move the turret head relative to the workpiece.

When the turret 12 is to be indexed, the coupling assembly 16 is operated from the engaged condition to the disengaged condition with the gear 128 in meshing engagement with the ring gear 130. However, as the coupling assembly 16 is disengaged the coupling member 34 and turret bar 20 are moved axially rearwardly (that is toward the left as viewed in FIG. 4). This causes teeth 140 on the gear 128 to slide axially along teeth 142 on the ring gear 130 as the gear 128 moves from the position indicated in dashed lines in FIG. 4 into the position shown in solid lines. The teeth 142 of the ring gear 130 have a relatively large face width or axial extent so that the turret bar 20 and gear 128 can be moved axially relatively to the ring gear 130 without moving the teeth 140 on the gear 128 out of meshing engagement with the teeth 142 of the ring gear.

Figure 6:
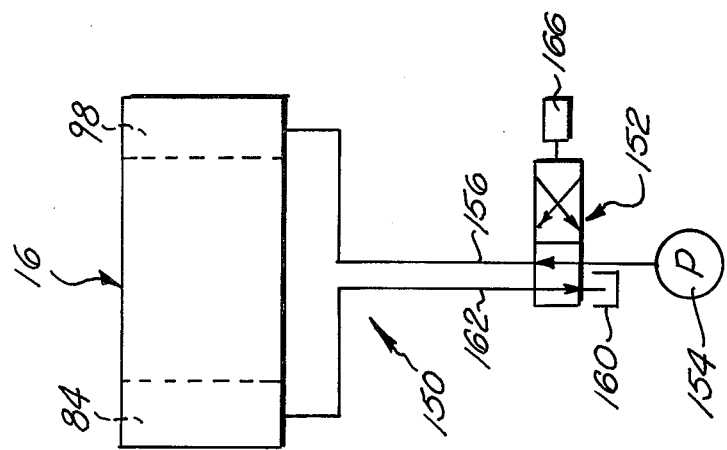
FIG. 6 is a schematic illustration of hydraulic control circuitry for effecting operation of the coupling assembly between the engaged and disengaged conditions.

A control assembly 150 for effecting operation of the clutch assembly 16 between the engaged and disengaged conditions is illustrated in FIG. 6. The control assembly 150 includes a valve 152 which normally ports fluid under pressure from a pump 154 through a conduit 156. The conduit 156 is connected with the chamber 98 in the coupling assembly 16. Therefore, the fluid pressure locks or holds the coupling assembly 16 in the engaged condition of FIG. 3. At this time the chamber 84 is connected with drain or reservoir 160 through the valve 152 and the conduit 162.

When the coupling assembly 16 is to be disengaged at the beginning of an indexing operation, a solenoid 166 is energized to actuate the valve 152. The valve 152 is then effective to port fluid under pressure from the pump 154 through the conduit 162 to the chamber 84. In addition, the actuated valve 152 connects the conduit 156 and chamber 98 with drain.

In view of the foregoing description, it is apparent that the machine tool 10 has an improved turret indexing and locking arrangement. When the turret head 12 is to be indexed, the axial drive assembly 15 is activated to move the turret head to the extended position. As the turret head 12 approaches the extended position, the gear 128 at the far end of the turret bar 20 moves into meshing engagement with the ring gear 130. The clutch assembly 16 is then actuated from the engaged condition to the disengaged condition under the influence of fluid under pressure to enable the turret bar 20 and turret head 12 to be rotated upon energization of the indexing motor 136. When the turret head 12 has been indexed to the desired position, the coupling assembly 16 is re-engaged and the axial drive assembly moves the turret head 12 relative to a workpiece supported on the spindle 16 to perform machining operations in a known manner.

Having described a specific preferred embodiment of the invention, the following is claimed:

1. A machine tool for operating on a workpiece, said machine tool comprising a base, turret means rotatably mounted in said base for holding a plurality of tools for operating on the workpiece, said turret means including a movable turret bar, means for supporting said turret bar for axial and rotational movement relative to said base, and a turret head connected with one end portion of said turret bar, coupling means operable between an engaged condition holding said turret bar against rotation relative to said base and a disengaged condition in which said turret bar is rotatable relative to said base to rotate said turret head and change the position of tools on said turret means relative to a workpiece, said coupling means including a first coupling member movable relative to said turret bar, a first set of teeth disposed on said first coupling member, a second coupling member fixedly connected with said turret bar, and a second set of teeth disposed on said second coupling member, said first and second sets of teeth being disposed in meshing engagement when said coupling means is in said engaged condition and being spaced apart when said coupling means is in said disengaged condition, first drive means for effecting rotation of said turret bar relative to said base when said coupling means is in said disengaged condition, second drive means connected with said base and said first coupling member for moving said turret bar axially relative to said base, said second drive means being operable to apply a force to said first coupling member in a direction tending to move said first coupling member away from said second coupling member to thereby tend to effect disengagement of said first and second sets of teeth and operation of said coupling means to said disengaged condition during axial movement of said turret bar, and actuator means for effecting operation of said coupling means between said disengaged and engaged conditions and for maintaining said coupling means in said engaged condition during axial movement of said turret bar under the influence of said second drive means, said actuator means including chamber means for receiving fluid under pressure to effect relative movement between said first and second coupling members and engagement of said first and second sets of teeth to thereby operate said coupling means from said disengaged condition to said engaged condition and for holding fluid under pressure to maintain said first and second sets of teeth in engagement and said coupling means in said engaged condition during axial movement of said turret bar.

2. A machine tool as set forth in claim 1 wherein said first drive means includes a first gear connected to an end portion of said turret bar opposite from said one end portion, a second gear connected with said base, and motor means for rotating said second gear, said second drive means being operable to move said turret bar axially between a first position in which said first gear is spaced from said second gear and a second position in which said second gear is disposed in meshing engagement with said first gear.

3. A machine tool as set forth in claim 1 wherein said chamber means includes a first surface area disposed on a side portion of one of said coupling members opposite from the set of teeth disposed on said one coupling member.

4. A machine tool as set forth in claim 1 wherein said actuator means further includes second chamber means for receiving fluid under pressure to effect relative movement between said first and second coupling members and disengagement of said first and second sets of teeth to thereby operate said coupling means from said engaged condition to said disengaged condition.

5. A machine tool as set forth in claim 4 wherein said second chamber means includes a first surface area disposed on a side of said first coupling member adjacent to said first set of teeth and a second surface area disposed on a side of said second coupling member adjacent to said second set of teeth.

6. A machine tool for operating on a workpiece, said machine tool comprising a base, turret means rotatably mounted on said base for holding a plurality of tools for operating on the workpiece, said turret means including a movable turret bar, means for supporting said turret bar for axial and rotational movement relative to said base, and a turret head connected with one end portion of said turret bar, coupling means operable between an engaged condition holding said turret bar against rotation relative to said base and a disengaged condition in which said turret bar is rotatable relative to said base to rotate said turret head and change the position of tools on said turret means relative to a workpiece, said coupling means including a first coupling member movable relative to said turret bar, a first set of teeth disposed on said first coupling member, a second coupling member fixedly connected with said turret bar, and a second set of teeth disposed on said second coupling member, said first and second sets of teeth being disposed in meshing engagement when said coupling means is in said engaged condition and being spaced apart when said coupling means in said disengaged condition, first drive means for effecting rotation of said turret bar relative to said base when said coupling means is in said disengaged condition, said first drive means including a gear connected to an end portion of said turret bar opposite from said one end portion, a second gear rotatably connected with said base, and motor means for rotating said second gear, second drive means connected with said base and said first coupling member for moving said turret bar axially relative to said base, said second drive means being operable to move said first gear from a position in which said first gear is spaced apart from said second gear and a position in which said first gear is disposed in meshing engagement with said second gear, and actuator means for effecting operation of said coupling means from the engaged condition to the disengaged condition when said first gear is in meshing engagement with said second gear, said actuator means including means for effecting relative movement between said first and second coupling members to disengage said first and second sets of teeth while maintaining said first and second gears in meshing engagement.

7. A machine tool as set forth in claim 6 wherein said actuator means includes first means for applying fluid pressure against at least one of said first and second coupling members to effect relative movement between said first and second sets of teeth and operation of said coupling means from said engaged condition to said disengaged condition, and second means for applying fluid pressure against at least one of said first and second coupling members to effect relative movement between said first and second sets of teeth and operation of said coupling means from said disengaged condition to said engaged condition.

8. A machine tool as set forth in claim 6 wherein said actuator means includes means for defining a variable chamber at least a portion of which is disposed between said first and second coupling members and means for conducting fluid under pressure to said variable volume chamber to effect an expansion of said variable volume chamber and operation of said coupling means from the engaged condition to the disengaged condition.

9. In a machine tool including a base, means connected with said base for holding a workpiece, rotatable turret means connected with said base for holding a plurality of tools, releasable coupling means operable between an engaged condition holding said turret means against rotation relative to said base and a disengaged condition in which said turret means is rotatable relative to said base to change the position of tools on said turret means relative to a workpiece, said coupling means including a first coupling element connected with said base, a first set of teeth connected with said first coupling element, a second coupling element connected with said turret means, and a second set of teeth connected with said second coupling element, and actuator means for operating said coupling means between the engaged condition in which said first and second sets of teeth are disposed in engagement to hold said turret means against rotation relative to said base and the disengaged condition in which said first and second sets of teeth are spaced apart to release said turret means for rotation relative to said base, the improvement wherein said actuator means comprises first surface means for defining a first chamber having a first surface area on said first coupling element and a second surface area on said second coupling element, second surface means for defining a second chamber having a third surface area on one of said coupling elements and a fourth surface area opposite from said third surface area, and control means for porting fluid under pressure to said first chamber to apply pressure to said first and second surface areas and effect movement of one of said coupling elements away from the other of said coupling elements to thereby effect operation of said coupling means from the engaged condition to the disengaged condition and for porting fluid under pressure to said second chamber to apply pressure to said third and fourth surface areas and effect movement of one of said coupling elements toward the other of said coupling elements to thereby effect operation of said coupling means from the disengaged condition to the engaged condition.

10. A machine tool for operating on a workpiece, said machine tool comprising a base, turret means rotatably mounted on said base for holding a plurality of tools, releasable coupling means operable between a first operating condition holding said turret means against rotation relative to said base and a second operating condition in which said coupling means is ineffective to hold said turret means against rotation relative to said base, said coupling means including a first coupling member connected with said base, a first set of teeth disposed on said first coupling member, a second coupling member connected with said turret means, a second set of teeth disposed on said second coupling member, and surface means for defining a chamber capable of being expanded and contracted and in which said first and second sets of teeth are disposed, said first and second sets of teeth being disposed in meshing engagement when said coupling means is in said first operating condition and being spaced apart when said coupling means is in said second operating condition, first means for applying fluid pressure against at least one of said first and second coupling members to effect relative movement between said first and second sets of teeth and operation of said coupling means from said first operating condition to said second operating condition, and second means for applying fluid pressure against at least one of said first and second coupling members to effect relative movement between said first and second sets of teeth and operation of said coupling means from said second operating condition to said first operating condition, said first means including means for conducting fluid under pressure to said chamber to expand said chamber and effect relative movement between said first and second sets of teeth and operation of said coupling means from said first operating condition to said second operating condition.

11. A machine tool for operating on a workpiece, said machine tool comprising a base, turret means rotatably mounted on said base for holding a plurality of tools, said turret means including a turret head having a plurality of face surfaces for supporting tools and a rotatable turret bar, releasable coupling means operable between a first operating condition holding said turret means against rotation relative to said base and a second operating condition in which said coupling means is ineffective to hold said turret means against rotation relative to said base, said coupling means including a first coupling member connected with said base, a first set of teeth disposed on said first coupling member, a second coupling member connected with said turret means, and a second set of teeth disposed on said second coupling member, said first and second sets of teeth being disposed in meshing engagement when said coupling means is in said first operating condition and being spaced apart when said coupling means is in said second operating condition, first means for applying fluid pressure against at least one of said first and second coupling members to effect relative movement between said first and second sets of teeth and operation of said coupling means from said first operating condition to said second operating condition, second means for applying fluid pressure against at least one of said first and second coupling members to effect relative movement between said first and second sets of teeth and operation of said coupling means from said second operating condition to said first operating condition, and first drive means for moving said turret bar axially along its axis of rotation under the influence of a force applied to said first coupling member in a direction tending to move said first coupling member away from said second coupling member and effect operation of said coupling means from said first operating condition to said second operating condition, said second means including means for applying fluid pressure against one of said coupling members during axial movement of said turret bar to prevent movement of said first coupling member away from said second coupling member to thereby maintain said coupling means in said first operating condition during axial movement of said turret bar.

12. A machine tool for operating on a workpiece, said machine tool comprising a base, turret means rotatably mounted on said base for holding a plurality of tools, releasable coupling means operable between a first operating condition holding said turret means against rotation relative to said base and a second operating condition in which said coupling means is ineffective to hold said turret means against rotation relative to said base, said coupling means including a first coupling member connected with said base, a first set of teeth disposed on said first coupling member in an annular array, said first coupling member including a first surface area disposed radially inwardly of a cylindrical plane disposed in a coaxial relationship with and extending through said first set of teeth, a second coupling member connected with said turret means, and a second set of teeth disposed on said second coupling member in an annular array, said second coupling member including a second surface area disposed radially inwardly of said cylindrical plane, said first and second sets of teeth being disposed in meshing engagement when said coupling means is in said first operating condition and being spaced apart when said coupling means is in said second operating condition, first means for applying fluid pressure against at least one of said first and second coupling members to effect relative movement between said first and second sets of teeth and operation of said coupling means from said first operating condition to said second operating condition, said first means including means for applying fluid pressure against said first and second surface areas to effect relative movement between said first and second sets of teeth, and second means for applying fluid pressure against at least one of said first and second coupling members to effect relative movement between said first and second sets of teeth and operation of said coupling means from said second operating condition to said first operating condition.

13. A machine tool for operating on a workpiece, said machine tool comprising a base, rotatable turret means connected with said base for holding a plurality of tools, releasable coupling means operable between an engaged condition holding said turret means against rotation relative to said base and a disengaged condition in which said turret means is rotatable relative to said base, said coupling means including a first coupling member connected with said base, a second coupling member connected with said turret means, and a third member circumscribing at least a portion of one of said coupling members, first variable volume chamber means at least a portion of which is disposed between said first and second coupling members and is at least partially defined by said third member, said first variable volume chamber means being operable from a contracted condition to an expanded condition to effect a separation of said coupling members and operation of said coupling means from the engaged condition to the disengaged condition, second variable volume chamber means at least a portion of which is disposed between one of said coupling members and said third member and is at least partially defined by said third member, said second variable volume chamber means being operable from a contracted condition to an expanded condition to effect engagement of said coupling members and operation of said coupling means from the disengaged condition to the engaged condition.

14. A machine tool as set forth in claim 13 further including valve means for porting fluid under pressure to said first variable volume chamber means to thereby effect operation of said first variable volume chamber means from the contracted condition to the expanded condition and for porting fluid under pressure to said second variable volume chamber means to thereby effect operation of said second variable volume chamber means from the contracted condition to the expanded condition.

* * * * *